United States Patent [19]

Endo et al.

[11] Patent Number: 4,567,525
[45] Date of Patent: Jan. 28, 1986

[54] CCD PICTURE ELEMENT DEFECT COMPENSATING APPARATUS

[75] Inventors: Yukio Endo; Nozomu Harada; Okio Yoshida, all of Yokohama, Japan

[73] Assignee: Kabushiki Kaisha Toshiba, Kawasaki, Japan

[21] Appl. No.: 661,050

[22] Filed: Oct. 15, 1984

[30] Foreign Application Priority Data

Oct. 18, 1983 [JP] Japan .................. 58-195074

[51] Int. Cl.$^4$ .............................. H04N 3/14
[52] U.S. Cl. .................................... 358/213
[58] Field of Search ................. 358/213, 212, 209, 10, 358/139, 167, 163; 357/24 LR

[56] References Cited

U.S. PATENT DOCUMENTS

| | | | |
|---|---|---|---|
| 3,944,816 | 3/1976 | Harada | 358/213 |
| 4,167,754 | 9/1979 | Nagumo et al. | 358/167 |
| 4,167,755 | 9/1979 | Nagumo et al. | 358/167 |
| 4,435,730 | 3/1984 | Bendell et al. | 358/213 |
| 4,499,497 | 2/1985 | Levine | 358/213 |

FOREIGN PATENT DOCUMENTS

2803686 8/1978 Fed. Rep. of Germany .
2902134 7/1979 Fed. Rep. of Germany .
55-32270 8/1980 Japan .
2116398 9/1983 United Kingdom .

Primary Examiner—Gene Z. Rubinson
Assistant Examiner—Stephen Brinich
Attorney, Agent, or Firm—Oblon, Fisher, Spivak, McClelland & Maier

[57] ABSTRACT

A solid-state image sensing device such as an interline-transfer type charge coupled device generates signal charges in response to incident light to produce an image signal. The CCD output signal includes a mixed reset pulse component from a reset pulse driver to the IT-CCD, as well as an image signal component corresponding to the signal charges. When the IT-CCD contains a defective picture element, position data of the defective picture element is stored into an address memory. An amplitude controller detects an increment of a signal level corresponding to a dark current generated at the defective picture element, and temporarily decreases the amplitude of the reset pulse only when the image signal is output from the defective picture element. In this way, the mixed reset pulse contained in the image signal output from the defective picture element is reduced, thereby subtracting the signal level increment from the CCD output signal produced from the defective picture element.

12 Claims, 29 Drawing Figures

CCD PICTURE ELEMENT DEFECT COMPENSATING APPARATUS

BACKGROUND OF THE INVENTION

The present invention relates to a solid-state image sensing device and, more particularly, to a technique for compensating a picture element defect due to a crystal defect in a solid-state image sensing device.

As is well known, a solid-state image sensing device is made up of a number of photosensing cells arrayed on a semiconductor substrate in a matrix fashion. The image sensing device, because of many advantageous features, has gradually superceded the conventional image sensing device and has found a variety of applications. Nevertheless, the image sensing device, such as a charge-coupled device (CCD), still involves problems to be solved. One of the problems is a low production yield of CCDs. In manufacturing the solid-state image sensing device or CCD, it is very difficult to form, with good precision and high uniformity, a semiconductor crystal over a fixed area. If a chip cut from a silicon wafer has even one local crystal defect, the thermal noise carriers are generated at the defective portion. The generated noise carriers cause a dark current of the CCD to extraordinarily increase. As a result, in an image signal output from the CCD, the signal derived from the defective portion or the defective picture element also rises in level with the increase of the dark current. The level rise of the defective picture element signal gives rise to white noise in a reproduced picture. This type of noise greatly deteriorates the quality of the reproduced picture.

For the above reasons, in an inspection stage of the CCD manufacturing, if even a single defective picture element is found in a CCD chip, which contains several hundreds of thousands of picture elements, such a CCD chip is scrapped as a defective chip. This fact greatly contributes to deterioration of the manufacturing yield of CCDs. The deterioration of the manufacturing yield results in a rise in the cost to manufacture CCDs. The CCD chip has a fairly high integration density of cells, which is comparable with that of LSI. Therefore, a good technique is required for stably manufacturing a perfect substrate, free from the crystal defect, and hence CCD chips containing no defective photosensing cells. In this respect, to eliminate the crystal defect is the most primitive, but the most ideal approach. However, this approach inevitably encounters a limit in improving the production yield.

Many other approaches than the above have been proposed in which compensation for the cell defect or crystal defect is applied for a CCD chip containing the crystal defect or the cell defect. At the present stage of this technology, however, there has been proposed none of successful approaches satisfactorily reducing the crystal defects.

In one of the CCD crystal correcting approaches, as is disclosed in Japanese Patent Disclosure (KOKAI) No. 55-32270, an external circuit is provided exclusively for a CCD chip. Image signals output from the CCD chip are subjected to a electrical correction, thereby removing the problem of a picture element defect. Let us assume that, of the picture elments, the n-th picture element is defective, and that the crystal defective noise of an extrodinary high level due to the dark current increase is contained in the signal component derived from the defective picture element. In this approach, a picture element signal component of a level exceeding a predetermined level is electrically detected and is replaced by another normal picture element signal component, for example, the $(n-1)$th picture element component in a circuit processing manner. Such a correction approach by the digital signal still involves the following problems.

(1) It is impossible to improve the image signal output from the CCD chip.

(2) The external circuit is required in addition to the CCD chip, resulting in complexity in the hardware configuration.

(3) All of the picture element signal components of higher levels than the reference level are unconditionally replaced by another signal level.

Therefore, to secure a satisfactory S/N ratio, it is very difficult to appropriately set the reference level.

SUMMARY OF THE INVENTION

It is therefore an object of the present invention to provide a new and improved solid-state image sensing device which, within the sensing device, compensates for a picture element defect due to (an increase of dark current which is caused by) a crystal defect contained in the solid-state image sensing device.

It is another object of the present invention to provide a new and improved solid-state image sensing device which can effectively eliminate the problem of a picture element defect arising from the crystal defect contained in the solid-state image sensing device, without use of an additional circuit arrangement such as any external electrical circuit, and provides a good quality of the reproduced picture.

According to the present invention, a solid-state image sensing device responds to incident light to generate signal charges and produces a CCD output signal at the output terminal thereof. The CCD output signal including an image signal component corresponding to the signal charges and a reset pulse signal component arising due to the mixing of a reset pulse signal supplied to said image sensor means into the CCD output signal. The reset pulse is mixed into the CCD output signal through a parasitic capacitance, which is inevitably formed between the reset pulse electrode and the floating diffusion layer provided at the output of the image sensing device, without regard to the presence or absence of the defective picture element. An amplitude of the mixed reset pulse signal in the CCD output signal is directly proportional to an amplitude of the reset pulse. When the image sensing device containes a defective picture element, a dark current generated at the defective picture element increases. Correspondingly, the CCD output signal derived from the defective picture element rises in level. The increased output signal level serves as noise.

According to the defective picture element compensating technique according to the present invention, a rise of the signal level, corresponding to the dark current generated at the defective picture element, is detected. When the image signal produced from the defective picture element is read out, the width of the pulse signal supplied to an image sensing means is temporarily decreased. With the decrease of the pulse amplitude, the mixed reset pulse component is reduced, which is contained in the output signal (picture element image signal) and produced from the defective picture element. As a result, the incremental level of the CCD output signal derived from the defective picture element is reduced. The reduction of the mixed reset pulse depends on an increased amount of the dark current at an actual defective picture element in an analog manner. By reducing the mixed reset pulse component, the output signal level at the defective picture element is corrected so as to be level with a level of the signal from a normal picture element.

The reduction of the mixed reset pulse is carried out by controlling the width of each of pulse signals applied to a reset gate electrode, a reset drain electrode, an output gate electrode and a reset gate electrode, which are formed at the CCD output, an electrode adjacent to the reset gate electrode, and another electrode provided adjacent to a floating gate diffusion layer.

DETAILED DESCRIPTION OF THE PREFERRED EMBODIMENTS

Figure 1:
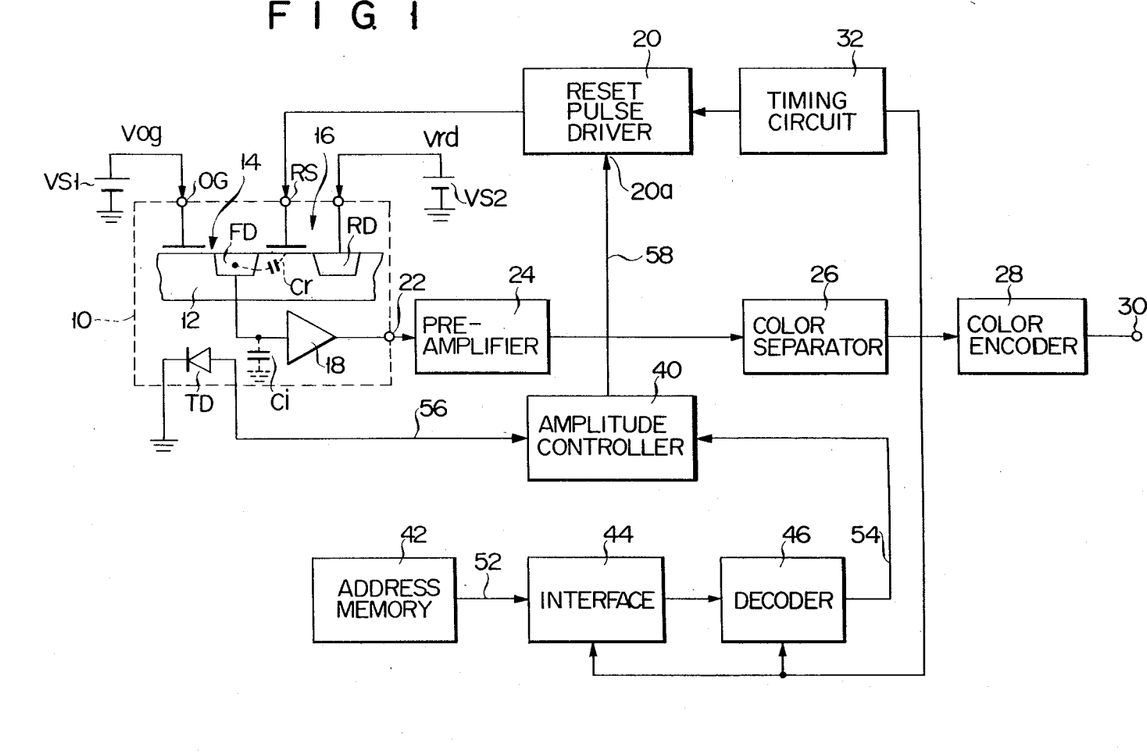
FIG. 1 is a block diagram schematically illustrating an overall arrangement of an image sensing device containing a picture element defective correcting circuit, which is an embodiment of the present invention.

Referring now to FIG. 1, there is illustrated a color image sensing device, such as a charge-coupled device (CCD) with a circuit arrangement for compensating a picture element defect, which is a first embodiment of the present invention. An interline-transfer type CCD (referred to as an "IT-CCD" hereinafter) is used for the CCD element.

Figure 2:
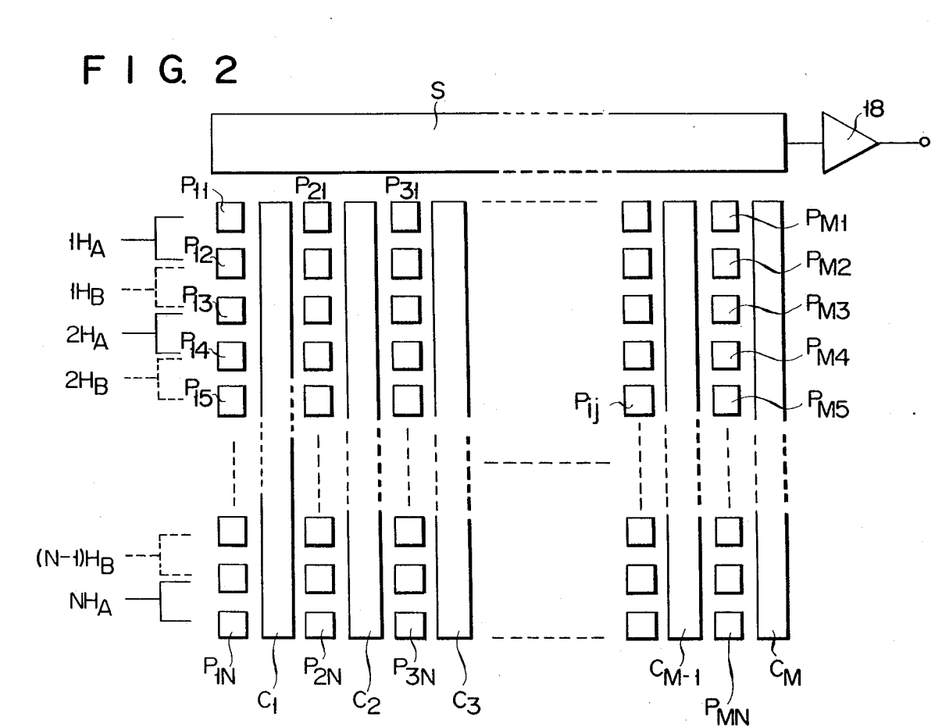
FIG. 2 is a plan view illustrating a major portion of an interline transfer type CCD chip which is applied to the image sensing device shown in FIG. 1.

As shown in FIG. 2, the IT-CCD 10 has a photosensitive section consisting of photodiodes $P_{11}$, $P_{12}$, ..., $P_{ij}$, ..., $P_{MN}$ of N by M (N=500 and M=400, for example). The photodiodes P are arranged in a matrix form on a silicon substrate. The M units of vertical CCD transfer sections $C_1$, ... $C_M$ are arranged adjacent to M lines of photodiodes $P_1$, ... $P_M$. The vertical CCD transfer sections $C_1$, ... $C_M$ are connected to a horizontal CCD shift register S at the final transferring stages thereof.

When a pulse voltage signal, or a gate control signal, is supplied to the CCD 10, signal carriers stored in the photodiodes P due to the incident light radiation are transferred to the vertical CCD transfer sections C and further successively transferred to the horizontal CCD shift register S. Such a circuit arrangement is fabricated on a silicon substrate 12 (FIG. 1) by the integrated circuit fabricating technology.

In the IT-CCD shown in FIG. 1, the image signal output section alone is illustrated for simplicity. The CCD image signal output section is known as a "floating diffusion type structure" in this technical field. As shown, the CCD output section is comprised of a detector section 14 including an output gate electrode OG formed on the substrate 12 and an electrically floating diffusion layer FD, a reset section 16 including a reset gate electrode RS and a drain region RD serving to discharge signal carriers from the diffusion layer FD, and an output stage amplifier 18 constructed with the MOS transistor. The signal carriers photoelectric converted in the photosensing sections are driven by the output gate voltage Vog applied from a first DC voltage source VS1 to an output gate electrode OG. When driven, the signal carriers jump over a potential barrier formed in the substrate and flow into the diffusion layer FD. The diffusion layer FD forms a detecting diode. A potential of the diffusion layer FD is reset to a drain voltage Vrd, prepared by a second DC voltage source VS2, in synchronism with the periods of the reset pulse signal supplied to the reset gate electrode RS. The signal carriers flowing into the diffusion layer FD are converted into an image signal voltage by a total capacitance Ci as given by the sum of the capacitances of the diffusion layer FD and the output stage amplifier 18. A reset pulse signal applied from a reset pulse driver 20 to the reset gate electrode RS of the IT-CCD 10 is mixed into the image signal, through a parasitic capacitance between the reset gate electrode RS and the diffusion layer FD. The image signal is current amplified by the output stage amplifier 18 and is produced at an output terminal 22.

The image voltage signal is transferred to an NTSC output terminal 30, by way of a preamplifier 24, a color separator 26, and a color encoder 28. The preamplifier 24 makes an impedance conversion and removes the mixed reset pulse from the image voltage signal, which is derived from the output terminal 22 of the IT-CCD 10. The color separator 26 separates the image voltage signal into a luminance component (Y), a red component (R) and a blue component (B). These signal components, after appropriately processed, are converted into an NTSC color image signal by the color encoder 28. A timing circuit 32, connected to a reset pulse driver 20, generates pulses necessary to drive the IT-CCD 10 and pulses necessary for the picture element defect compensation to which the present invention is directed. The two types of pulses generated are synchronized with each other.

Figure 3:
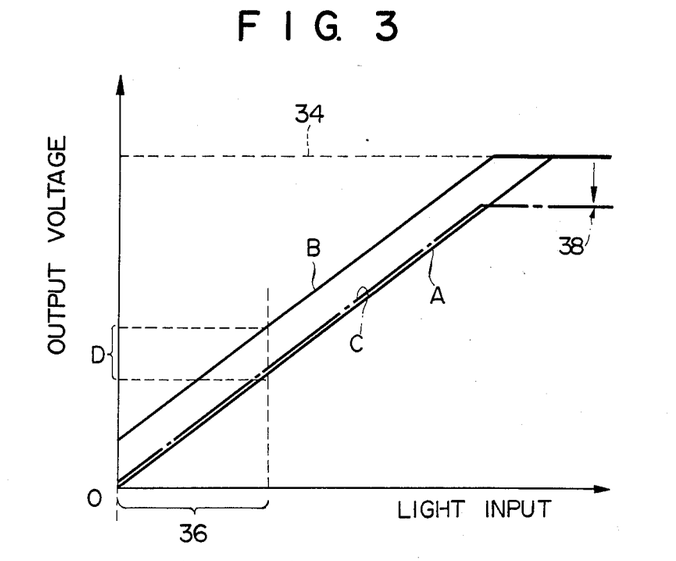
FIG. 3 shows a graph illustrating a photoelectric converting characteristic at a defective picture element contained in the CCD chip, which is actually measured.

Qualitative considerations will be given on the defective picture element which may occur in the IT-CCD 10 and the mixed reset pulse. FIG. 3 graphically illustrates a photo-electric characteristic of one picture element, viz., a relationship of the output voltage versus incident light one picture element. The plotted data were actually measured by the inventors of the present patent application. In the case of a normal picture element, a γ-value is approximately 1, as indicated by a line A in FIG. 3. For incident light in an intensity level greater than a predetermined level, the output voltage is fixed at a saturation voltage level 34. In an actual use of the IT-CCD 10, a range 36 of the incident light is set below approximately ⅓ of a saturation point of the light, thereby to prevent generation of an unnatural picture.

In FIG. 3, the photoelectric converting characteristic of an undesciable defective picture element, which is caused by a local crystal defect in the substrate 12 of the IT-CCD 10, is represented by a line B. As seen from the graph, line B is upwardly and parallel displaced by an offset value D from line A representing the photoelectric converting characteristic of the normal picture element by an offset value D corresponding to the dark current generated due to the crystal defect. Line B implies that the defective picture element still has a photoelectric converting function against incident light, although the output voltage of the defective picture element has additionally the fixed increment D (offset value) corresponding to the generated dark current. It is to be noted here that the increment D (offset value), as the additional component of the output voltage of the defective picture element, is uniform or fixed over the entire range of the effective incident light set in the IT-CCD 10. It is assumed that as for the above defective picture element alone, the increment D (offset component) of the output voltage corresponding to the generated dark current caused by the local crystal defect in the substrate 12 is uniformly subtracted from the output voltage of the defective picture element over the entire range of the incident light of the IT-CCD 10. If so done, line B is downwardly displaced to be line C. Line C substantially overlaps line A. In this case, the saturation voltage level is reduced by the offset component D from the normal saturation voltage level, as indicated by numeral 38. However, as recalled, the effective incident light range of the IT-CCD 10 is continued in the range 36 of about ⅓ before the saturation input. Therefore, the decrease of the saturation voltage level provides no problem in practical use.

Figure 4:
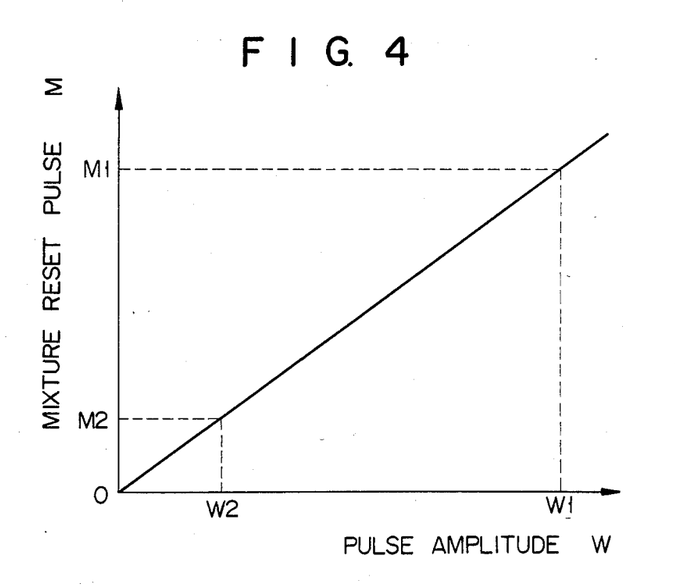
FIG. 4 is a graph illustrating a relationship, an amplitude, or level of the mixed reset pulse against an amplitude of a reset pulse supplied to the CCD chip.

FIG. 4 graphically illustrates a relationship of an amplitude W of a reset pulse signal against an amount M of the mixed reset pulse component contained in the CCD output picture element signal. Incidently, the reset pulse signal is supplied from the reset pulse driver 20 to the reset gate electrode RS. This graph shows that the amount M of the mixed reset pulse component is directly proportional to the width W of the reset pulse signal. In the graph, the pulse amplitude W1 represents an amplitude of a normal reset pulse signal. For the amplitude W1, an amount of the mixed reset pulse component is M1. W2 represents an amplitude of the reset pulse signal for the defective picture element. For the amplitude W2, an amount of the mixed reset pulse component is M2. As recalled, γ-value of the normal picture element is approximately "1". Therefore, if an amount corresponding to the offset D of the defective picture element is subtracted from the amount of the mixed reset pulse component, the CCD output signal varies along the photoelectric converting characteristic line C, as described by referring to FIG. 3. A ratio of the reset pulse amplitude to its mixed amount is approximately 1/20. For example, when a reset pulse signal of 10 Vp-p (peak to peak value) is applied to the reset gate electrode RS, the CCD output signal contains the reset pulse of 500 mVp-p. The saturation voltage level of the IT-CCD 10 is about 1000 mVp-p. The effective incident light range of the IT-CCD 10 is 300 mVp-p, i.e., about ⅓ of the saturation voltage level. Therefore, the offset component of the defective picture element can appropriately be corrected over a voltage range up to a maximum voltage used.

As described above, the present invention is based on a core concept in which saving a CCD chip, containing a defective picture element or the compensation of the defective picture element, is carried out by reducing the mixed reset pulse contained in the CCD output voltage signal of the IT-CCD 10 according to the offset D of the output voltage from the defective picture element. A first embodiment of the present invention realizes the core concept in the following manner.

Returning to FIG. 1, provided in the CCD substrate 12 is a thermo-sensing element TS as a PN junction diode formed on the substrate 12. The thermo-sensing element TS is coupled with an amplitude control circuit or an amplitude controller 40. The amplitude controller 40 is connected to the reset pulse driver 20. An address memory 42 as a PROM (programmable read only memory), for example, is provided for storing position data of defective picture elements undesirably existing in the IT-CCD 10. The address memory 42 is connected through an interface circuit 44 and a decoder unit 46 to the amplitude controller 40. The interface circuit 44 and the decoder unit 46, connected to the timing circuit 32, are under control of the timing circuit 32.

In the present embodiment, the amplitude controller 40, the address memory 42, the interface circuit 44, the decoder unit 46, and the like, constituting a picture element defect compensating circuit, are fabricated into one or more external IC chips. For saving a defective CCD chip containing a defective picture element, it is sufficient to connect the external IC chip, as a picture element defect compensating circuit unit, to the defective CCD chip.

Figure 5A:
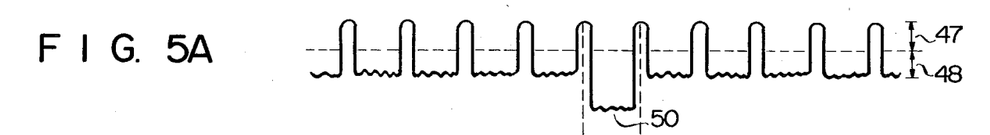
FIGS. 5A to 5E show a set of waveforms of electrical signals observed at key portions in the circuit arrangement shown in FIG. 1.

Generally, in the solid state image sensing device of the above type, a reset pulse is inevitably mixed into the image output signal through a parasitic capacitance Cr, existing between the reset gate electrode RS and the floating diffusion layer FD. This fact implies that the output signal from the solid state image sensing device contains a predetermined amount of reset pulse component 47 without regard to the presence or absence of the picture element defect. In other words, the output signal from the solid state image sensing device is composed of a mixed reset pulse component 47 and an essential signal component or an image signal component 48. In the manufacturing process of the IT-CCD 10, if the IT-CCD 10 contains one defective picture element, for example, the output signal from this IT-CCD 10 contains a signal level variation component 50 due to a dark current generated at the defective picture element, as shown in FIG. 5A. In other words, it contains the signal component 50 with an extrodinarily high level (which goes downwardly in the drawing), according to the dark current generated at the defective picture element. As already described, the defective picture element has a photoelectric converting characteristic, as indicated by line B in FIG. 3. The position coordinates of the defective picture element on the CCD substrate 12 are stored in the address memory 42.

Figure 5B:
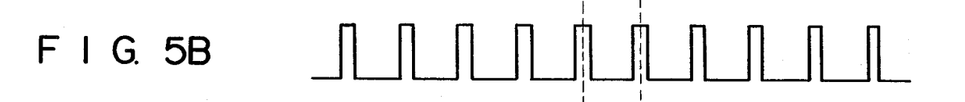
Figure 5C:
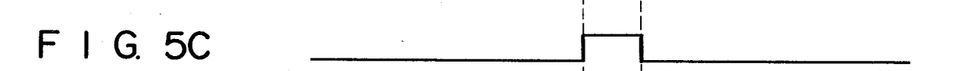

Therefore, the address memory 42 produces an address pulse signal 52 for only the position of the defective picture element. At this time, a reset pulse signal illustrated in FIG. 5B has been applied to the reset electrode RS of the IT-CCD 10. The pulse 52 from the address memory 42 is applied to the interface circuit 44. In the interface circuit 44, it is converted into a pulse signal with the same period as the clock period of the IT-CCD 10. The decoder unit 46 responds to a pulse signal output from the interface circuit 44 and supplies to the amplitude controller 40 an address pulse signal 54 for specifying the position of a defective picture element. The address pulse signal 54 takes a waveform shown in FIG. 5C. The address pulse signal 54 changes its level during a period when the reset pulse signal of FIG. 5B is high in level.

The amplitude controller 40 receives the address pulse signal 54 to generate a pulse amplitude voltage corresponding to the offset D due to the increase in dark current at the defective picture element. Since the dark current at the defective picture element changes in accordance with ambient temperature, the offset D thereat also changes with the temperature. To compensate for such a temperature characteristic, the amplitude controller 40 makes use of a temperature signal 56 derived from a thermo-sensing element TS in the IT-CCD 10 and produces a pulse width voltage corresponding to the offset D at the defective picture element, which is appropriately or exactly based on the ambient temperature.

Figure 5D:
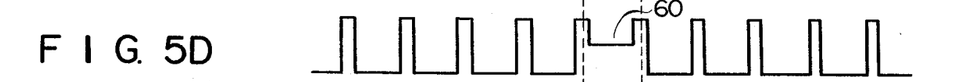
Figure 5E:
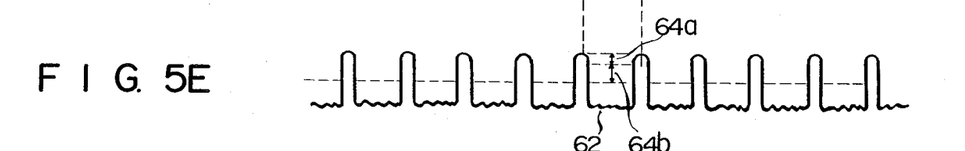

An amplitude controlled signal 58 produced from the amplitude controller 40, taking a waveform shown in FIG. 5D, is supplied to a low level voltage control terminal 20a of the reset pulse driver 20. Specifically, only at the time of reading out an image signal portion at the defective picture element does the amplitude of the reset pulse, applied to the reset gate electrode RS of the IT-CCD 10, decrease so as to compensate for the offset D, as indicated by "60" in FIG. 5D. Therefore, the mixed reset pulse M in the image signal output from the CCD decreases corresponding to the amplitude decrease of the reset pulse. As a result, the image signal from the defective picture element is appropriately reduced so as to have exactly the same signal level as that of the image signal derived from another normal picture element. The reduced image signal is denoted as 60 in FIG. 5E. The output signal from the chip containing a defective picture element is corrected in this way without an external correcting circuit, and may be used like a normal CCD chip free from the defective picture element. In correcting the image signal from the defective picture element, it is essential that the sum of the offset D for the defective picture element and the mixed reset pulse M be equal to the mixed reset pulse for the usual or normal picture element. In FIG. 5E, a signal pulse 64a corresponds to the mixed reset pulse M for the defective picture element, while a signal voltage 64b corresponds to the offset D for the defective picture element.

As seen from the foregoing description, the first embodiment of the present invention can reduce an incremental change or an increment of a level in the image signal output from the IT-CCD 10, which arises from an abnormal increase of the dark current due to a local crystal defect. Therefore, the noise signal owing to the increase of the dark current can reliably be removed. In this way, the output image signal of the CCD chip itself can directly be subjected to the analog correction of the picture element defect. Therefore, this embodiment is applicable for any type of the color image pick-up system as well as the monochromatic video camera. Further, the compensation of the picture element defect is carried out within the IT-CCD 10 per se. Therefore, the defective CCD chip, after compensation of the picture element defect, can be used as normal CCD chips with no defective picture element.

In the coventional digital defective picture element compensating technique, a high level image signal component derived from a defective picture element is forcibly compared with that from another adjacent normal picture element. On the other hand, the defective picture element compensating technique does not require such a comparison of the image signal component. Therefore, according to this invention, an image can well be picked up, without yielding any compensation error, against the incident light with a high constrast ratio in the vertical direction on the horizontal picture element arrangement.

Figure 6:
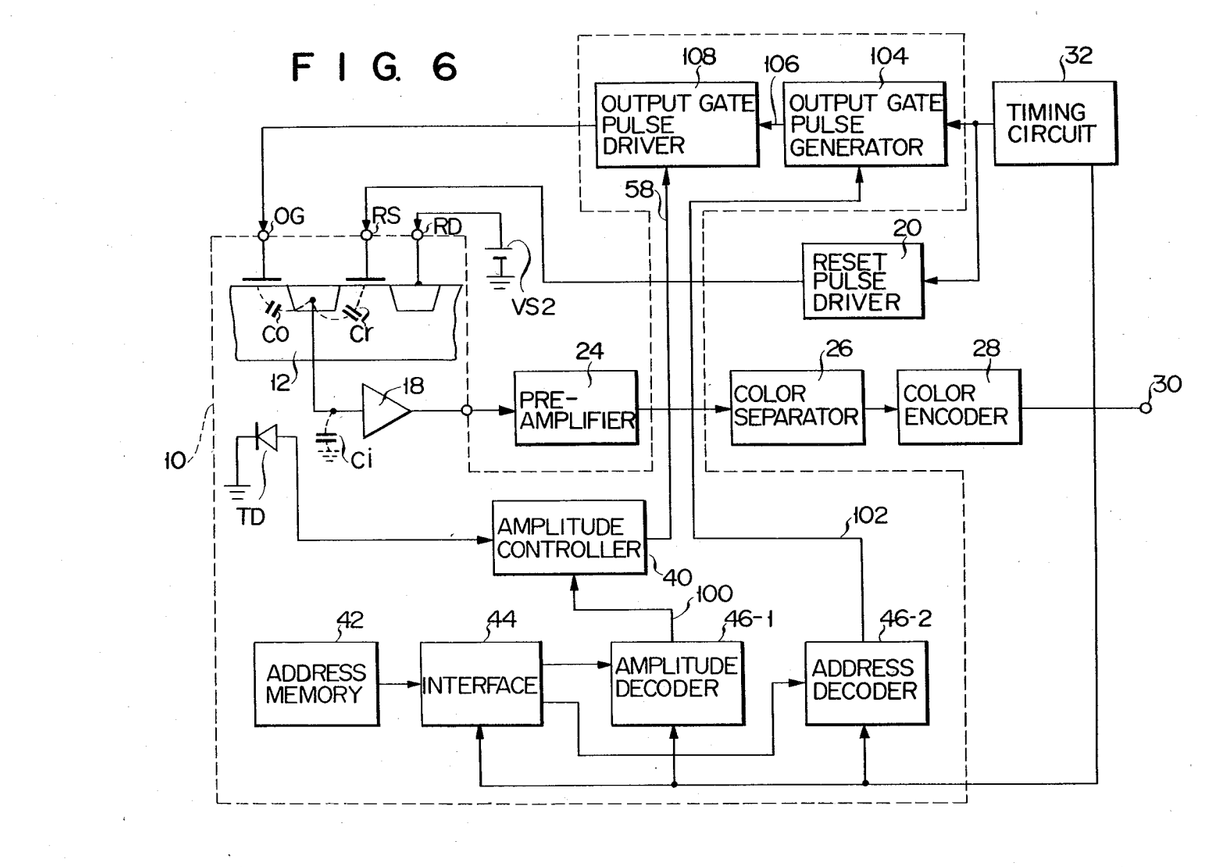
FIG. 6 shows a block diagram schematically illustrating an overall circuit arrangement of an image sensing device containing a defective picture element compensating circuit; the image sensing device is a second embodiment of the present invention.

Turning now to FIG. 6, there is shown a color image sensing device containing a picture element defect compensating circuit, which is a second embodiment of the present invention. In FIG. 6, like symbols are used for designating like or equivalent portions in FIG. 1 illustrating the first embodiment. A circuit configuration corresponding to the second embodiment was actually designed and operated by the inventors in the present patent application. The data collected by operating the device showed satisfactory performances of the image sensing device. In this respect, it is safe to say that this image sensing device embodies the present invention in the best mode.

The image sensing device shown in FIG. 6 contains a picture element compensating circuit for compensating a picture element defect by controlling a voltage applied to the output gate electrode OG of the IT-CCD 10. More specifically, the amplitude controller 40, the address memory 42, the interface circuit 44, the decoder unit 46, an output gate pulse generator 104, an output gate pulse driver 108, and the like are fabricated, as components constituting the picture element defect compensating circuit, into the CCD chip substrate 12. In this respect, this circuit arrangement composed of those components is useless for normal CCD chips not containing defective picture elements. Position data of a defective picture element on the CCD chip is stored into the address memory 42 consisting of a PROM 42. Read and write operations of the data into and from the address memory 42 are performed at a much slower speed than a usual memory accessing speed, in order to save power dissipation in the memory. The interface circuit 44 adapts such a slow access speed for the position data for a normal memory access speed. The position data read out from the address memory 42 is supplied to the amplitude decoder 46-1 and the address decoder 46-2 through the interface circuit 44. The decoders 46-1 and 46-2 respectively generate pulse signals 100 and 102 corresponding to an amplitude of the signal from the defective picture element and an address position of the same. At this time, the reset pulse signal remains innate, that is, it is not subjected to any signal processing.

The amplitude pulse signal 100 from the decoder 46-1 is supplied to the amplitude controller 40, while the address pulse signal 102 from the decoder 46-2 is supplied to the output gate pulse generator 104. The generator 104, under timing control of the timing circuit 32, supplies an output gate pulse signal 106 to the output gate pulse driver 108. The driver 108 is connected to the output gate electrode OG.

Figure 7A:
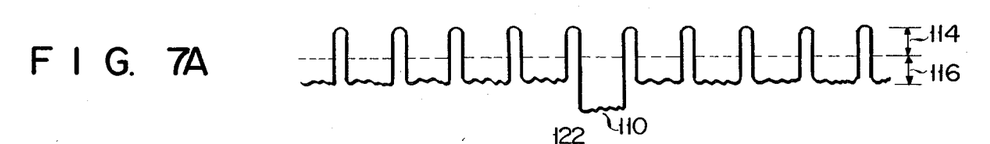
FIGS. 7A to 7F show a set of waveforms of electrical signals observed at key portions in the circuit arrangement shown in FIG. 6.
Figure 7B:
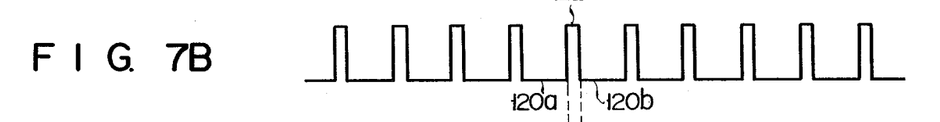
Figure 7C:
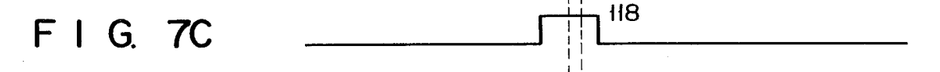
Figure 7D:
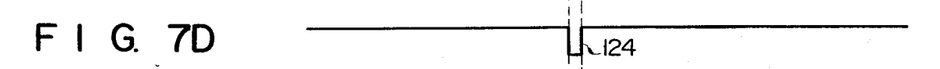
Figure 7E:
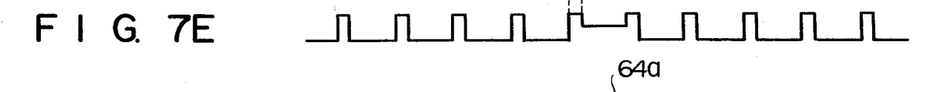
Figure 7F:
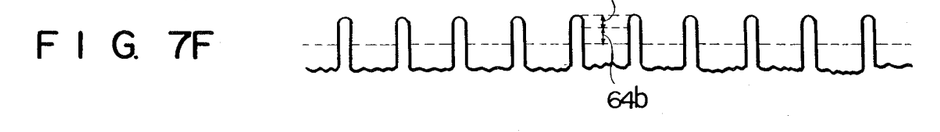

The output gate pulse generator 104 receives the address pulse signal 102, and ANDs the address pulse signal 102 and the on-period of the reset pulse signal derived from the timing circuit 32, thereby to extract or detect an output gate signal 106 with a pulse waveform 124 as depicted in FIG. 7D. Further, the output gate pulse generator 104 produces an output gate pulse 124 of which the polarity is opposite to that of the reset pulse only during the ON-period of the reset pulse just prior to the defect picture element position or the defective picture element signal 110. The output gate pulse driver 108 controls an amplitude of the opposite polarity pulse 124 of the gate output signal 106 by an amplitude adjusting signal 58 output from the amplitude controller 40. The controller 40 produces a voltage level corresponding to a magnitude of a temperature change of the defective picture element of the IT-CCD 10. The output gate pulse driver 108 supplies the output pulse signal 106 to the output gate electrode OG of the IT-CCD 10. Accordingly, the amplitude controlled pulse 124 is superposed to the CCD output signal from the defective picture element through the parasitic capacitance Co. As a result, the mixed reset pulse contained in the CCD output image signal is reduced by an offset corresponding to an increment of the dark current at the defective picture element, thereby to correct the defective picture element output signal. FIG. 7F shows the image signal waveform after the signal component from the defective picture element is corrected.

There will now be described, in greater detail, the defective picture element compensating technique in accordance with the second embodiment. The output gate electrode OG formed at the output section of the IT-CCD 10, like the reset gate electrode RS, has a parasitic capacitance Co between the electrically floating diffusion layer FD and the electrode OG itself. The mixing of the reset pulse into the image signal is carried out through the parasitic capacitance Cr between the reset gate electrode RS and the diffusion layer FD. Therefore, if the pulse of which the polarity is opposite to that of the reset pulse is applied to the output gate electrode OG, the mixed reset pulse in the CCD image signal is reduced at only the portion of the electrode applied with the opposite polarity pulse. In this case, the opposite polarity output gate pulse 124, amplitude controlled is applied to the output gate electrode OG during only the on-period of the reset pulse signal, it is superposed to the CCD output signal derived from the defective picture element through the parasitic capacitance Co between the output gate electrode OG and the diffusion layer FD. Accordingly, at the time of the resetting operation, a mixing level of the reset pulse to the CCD picture element is reduced by an amount of increment of the dark current at the defective picture element. As a result, the output signal from the defective picture element can be level with the output signal from other normal picture elements. The present embodiment requires the followings. The output pulse from the output gate electrode OG is proportional to the input pulse. The process margin of the output gate electrode is not damaged. A high speed performance of the pulse is secured. The capacitance CR on the reset gate RS side is substantially equal to the capacitance on the output gate electrode OG side. For these requirements, the experiment conducted by the inventors showed that, for signal voltage of 200 mV as set, the defective picture element up to 200 mV offset voltage can satisfactorily be compensated. Particularly, as for the process margin, since the negative going pulse is applied to the output gate electrode OG, it is increased. As for the requirements for the high speed pulse performance and the capacitance Cr, there is no problem in particular since the output gate electrode OG has a structure similar to that of the reset gate electrode RS.

According to the aforementioned second embodiment of the present invention, the compensation of the picture defect is carried out within the IT-CCD 10 per se. Therefore, the defective CCD chip, after the compensation of the picture element defect, can be used as a normal CCD chip with no defective picture elements. In other words, according to the present embodiment, the defective CCD chip, which otherwise must be discarded or use an additional external correction circuit specially designed, can be used like the normal CCD chip. Thus, without any special manufacturing technique, the present invention can solve the yield problem in manufacturing the CCD chips, to which a satisfactory solution was very difficult for the prior art.

Figure 8:
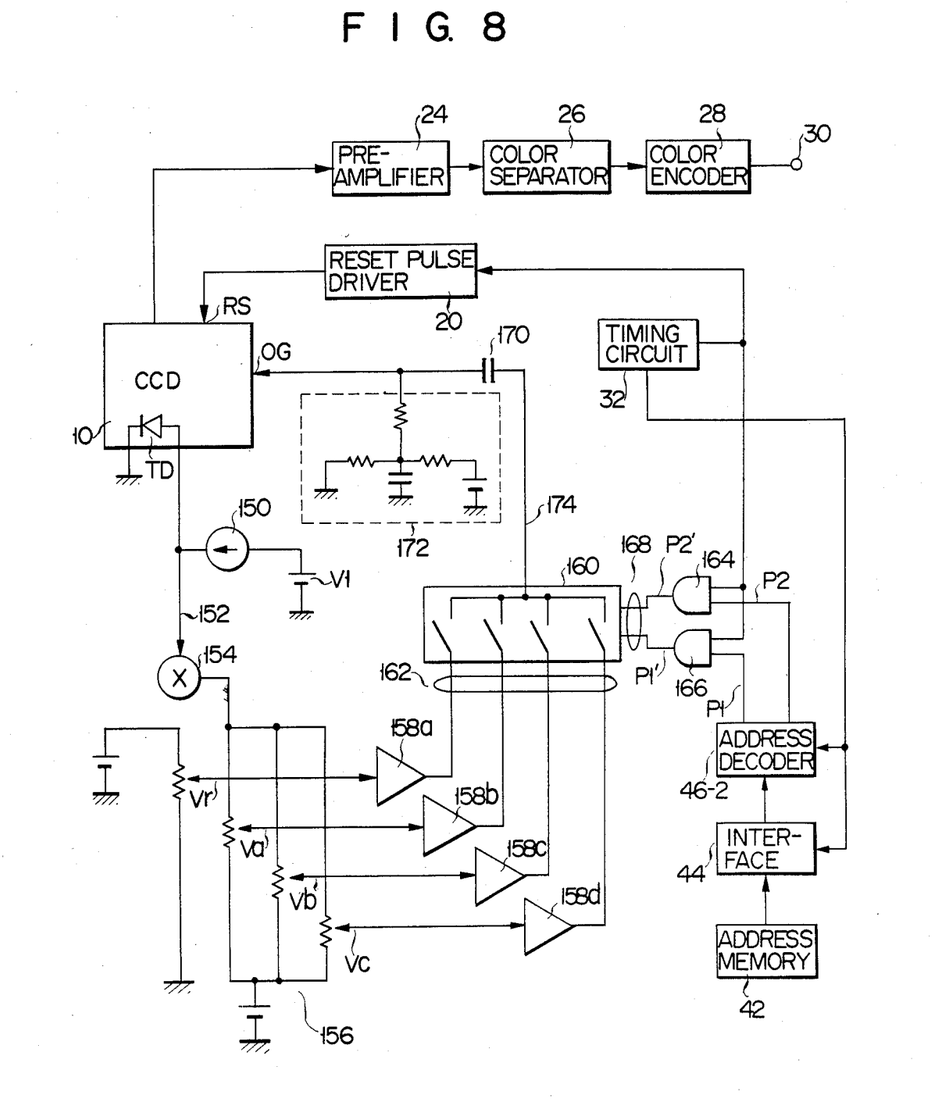
FIG. 8 is a block diagram schematically illustrating an overall arrangement of an image sensing device containing a picture element defect compensating circuit; the image sensing device is a modification of the second embodiment of the present invention.

Referring now to FIG. 8, there is shown a color image sensing device with a picture element defect compensating circuit built therein, which is a modification of the second embodiment of the present invention. Also in FIG. 8, like reference symbols are used for designating like or equivalent portions in the above-mentioned embodiments. This modification is specially designed so as to cope with the defective picture element problem of the type in which a single chip contains a plurality of defective picture elements. To this end, the modification employs the digital defective picture element compensating concept based on the output gate pulse as is used in the second embodiment. In the modification, the temperature compensation is additionally applied for the defective picture elements.

In the image sensing device shown in FIG. 8, it is assumed that the IT-CCD 10 contains three defective picture elements. A thermo-sensor TS is driven by a constant current circuit 150 using a DC voltage generator V1 and produces a voltage signal 152 representing a temperature change. The signal 152 is supplied to a multiplier 154. The multiplier 154 produces DC voltages va, vb and vc corresponding to three defective picture elements contained in the IT-CCD 10. These DC voltages va, vb and vc are held by a volume unit 156. The volume unit 156 also produces a reference voltage vr. These DC voltages va, vb, vc and vr are respectively applied through buffer amplifiers 158a–158d to analog input terminals 162 of an analog multiplexer 160.

The position data of the defective picture elements on the IT-CCD 10 are stored into the address memory 42. The data read out of the address memory 42 is supplied through the interface circuit 44 to an address decoder 46-2. An address decoder 46-2 is connected to the control input terminals 168 of the multiplexer 160. Connected to the output gate electrode OG of the IT-CCD is a bias circuit 172 composed of a DC voltage source, a capacitor and resistors.

In fabricating the circuit arrangement, the address memory 42, the interface circuit 44, the address decoder 46-2, the multiplier 150, the volume unit 156, the buffer amplifiers 158, the analog multiplexer 160, AND gates 164 and 166, the capacitor 170 and the bias circuit 170 are all integrated onto the chip substrate of the IT-CCD 10.

Figure 9A:
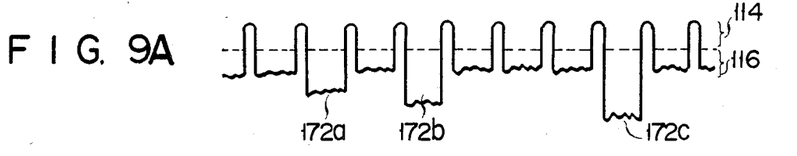
FIGS. 9A to 9L show a set of waveforms of electrical signals observed at key portions in the circuit arrangement shown in FIG. 8.
Figures 9B, 9C:
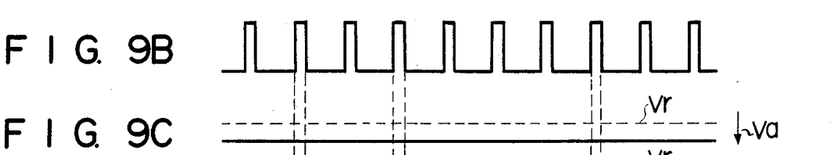
Figure 9D:
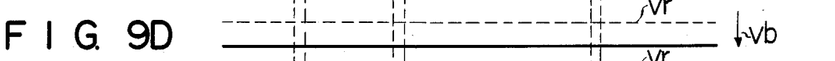
Figure 9E:
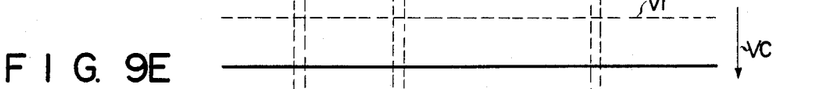
Figure 9F:
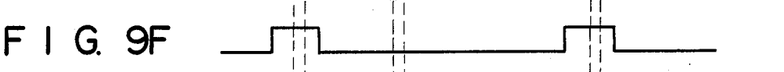
Figure 9G:
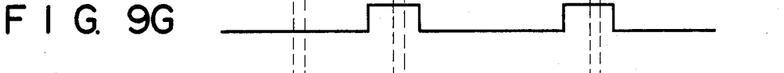
Figures 9H, 9I, 9J:
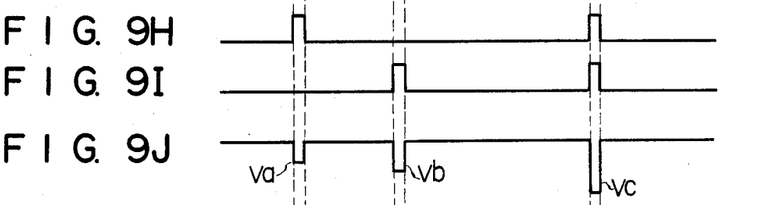
Figure 9K:
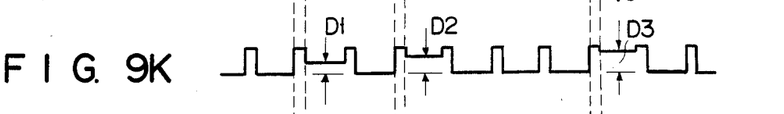
Figure 9L:
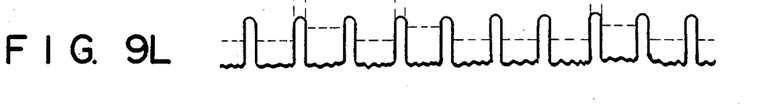

The output signal from the IT-CCD 10 containing three defective picture elements includes three defective picture element signal components 172a, 172b and 172c of different levels, as shown in FIG. 9A. A waveform of the reset pulse signal applied to the reset gate electrode RS of the IT-CCD 10 is as depicted again in FIG. 9B. The DC voltages va, vb and vc are respectively generated, by the multiplier circuit 154, corresponding to the three defective picture elements and further temperature compensated. These voltages are incremented in level from the level of the reference voltage vr, as illustrated in FIGS. 9C–9E. The address decoder 46-2 produces address pulse signals P1 and P2 each of which rises and falls at the OFF-periods of the reset pulse signal of FIG. 9B (FIGS. 9F and 9G). The AND gate 164 performs the AND operation on the address pulse signal P1 and the reset pulse signal, thereby producing an address pulse signal P1' synchronized with the reset pulse, as shown in FIG. 9H. The AND gate 166 performs the AND operation on the address pulse signal P2 and the reset pulse, thereby producing an address pulse signal P2' synchronized with the reset pulse. These pulse signals P1' and P2' are produced only during the ON-periods of the reset pulse signal. The address pulse signals are supplied to the control input terminals of the analog multiplexer 160. Accordingly, the output terminals of the multiplexer 160 provides an output gate pulse signal 174 having pulses of which amplitudes are modified by the offset values D1, D2 and D3 respectively corresponding to the defective picture elements, as shown in FIG. 9K. The output gate pulse signal 174 is supplied to the output gate electrode OG of the IT-CCD 10 through the capacitor 170. At this time, the pulse signal 174 is level-adjusted to a predetermined voltage by the bias circuit 172. The output gate pulse 174 thus amplitude modified is applied to the output gate electrode OG of the IT-CCD 10 when the image signal is read out at the output stage of the IT-CCD 10. If so done, the offset values D1, D2 and D3, which are due to the dark current increase, are subtracted from the mixed reset pulses. It is noted here that the mixed reset pulses are those of only the CCD image signal from the defective picture elements. In this way, noise of the output signal components derived from the defective picture elements is removed substantially at the time of outputting the image signals from the IT-CCD 10. The image signal thus compensated has much the same waveform as that of the image signal from the normal picture element, as shown in FIG. 9I. Therefore, the IT-CCD containing the defective picture elements is operable like that without defective picture elements. It is noted that since this modification employs the analog multiplexer 160 in the circuit section for generating the output gate pulse signal 174, deformation of the pulse waveform can be minimized even when the pulse width varies.

Although the present invention has been shown and described with reference to particular embodiments, various changes and modifications which are obvious to a person skilled in the art to which the invention pertains are deemed to lie within the spirit and scope of the invention.

While in the above-mentioned embodiments the present invention has been described as applied to the interline transfer type CCD, the invention is, of course, applicable for the frame transfer type CCD. The present invention is applicable for any type of solid state image sensing devices in which the sensing section is formed of a floating diffusion layer and periodically reset. Further, the solid-state image sensing device according to the present invention may have a γ-value other than 1, which is the value of the image sensing device used in the embodiments as mentioned above. In this case, it is sufficient to set in the amplitude control circuits shown in FIGS. 5 to 7 a γ coefficient for compensating for the γ-value of the solid state image sensing device used.

Furthermore, the conventional defective picture element compensating technique and that of the present invention may be combined such that the former is applied for the defective picture element to which the latter is insensitive, and the latter is applied for the defective picture element to which the former is insensitive. Such a combined use remarkably improves the manufacturing yield of the CCDs.

What is claimed is:

1. A solid-state image sensing apparatus comprising:
   (a) solid-state image sensor means for generating signal charges in response to incident image light thereto to produce an electrical CCD output signal at its output terminal, said CCD output signal including an image signal component corresponding to the signal charges and a reset pulse signal component arising due to the mixing of a reset pulse signal supplied to said image sensor means into the CCD output signal; and
   (b) picture element compensating means for, when said image sensor means contains a defective picture element, detecting in an analog manner an increment of a signal level corresponding to a dark current generated at the defective picture element, and for compensating the picture element defect in such a way as to reduce, by the increment of said detected signal level, the mixed reset pulse component contained in the CCD output signal produced from said defective picture element, whereby the output signal from said image sensor means is substantially equivalent to that of a normal image sensor.

2. The device accoding to claim 1, wherein picture element defect compensating means comprises:
   memory means for storing data representing a position of the defective picture element of said image sensor means; and
   amplitude controller means, connected to said memory means, for reducing the amplitude of said reset pulse signal by said dark current component generated at said defective picture element according to the position data of the defective picture element only at the time of outputting the image signal from said defective picture element.

3. The device according to claim 2, wherein said amplitude controller means reduces the amplitude of said reset pulse signal so that the sum of the increment of the signal level corresponding to the dark current generated at said defective picture element and said reduced mixed pulse component contained in the CCD output signal produced from said defective picture element is substantially equal to a mixed reset pulse component contained in a CCD output signal produced from another normal picture element of said image sensor means.

4. The device according to claim 3, wherein said memory means and said amplitude controller means are provided separately from said image sensor means.

5. The device according to claim 3, wherein said memory means and said amplitude controller means are at least partially assembled inside said image sensor means.

6. The device according to claim 3, wherein said memory means and said amplitude controller means are previously assembled into said image sensor means.

7. The device according to claim 3, wherein said picture element defect compensating means further comprises a thermo-sensing means previously formed in said image sensor means, for sensing temperature of said image sensor means to generate a temperature signal.

8. The device according to claim 7, wherein said amplitude controller means is connected to said temperature detector means, for detecting an increment of a signal level corresponding to a dark current which is generated at said defective picture element and changes with temperature, and for reducing the amplitude of said reset pulse signal so that the sum of the detected increment of the signal level and said reduced mixed pulse component contained in the CCD output signal produced from said defective picture element is substantially equal to the mixed reset pulse component contained in the CCD output signal produced from said normal picture element of said image sensor means.

9. The device according to claim 1, wherein said picture element defect compensating means reduces the mixed reset pulse component contained in the CCD output signal produced from said defective picture element by temporarily decreasing the amplitude of the reset pulse signal at the time of reading out the image signal generated at said defective picture element.

10. The device according to claim 1, wherein said image sensor means comprises:
a semiconductive substrate;
photosensing cells formed on said sbustrate in a matrix fashion, for generating charge packet or signal carriers in response to incident light thereto and for storing therein the signal carriers;
charge transfer means formed on said substrate, for successively transferring the signal carriers stored in said photosensing cell to the output terminal of said image sensor means;
charge sensing means formed on said substrate and, for receiving an output gate signal and for reading out said signal charges in response to the output gate signal, said charge sensing means including an output gate electrode and an electrically floating layer, which are formed on said substrate, said electrode and said layer forming a first parasitic capacitance therebetween; and
reset means formed on said substrate, for receiving the reset pulse signal and for discharging, at fixed periods, the signal charges transferred to said charge sensing means in response to the reset pulse signal, said reset means having a reset gate electrode formed on said substrate substantially adjacent to said electrically floating layer, and an electrically floating drain layer, said reset gate electrode and said drain layer forming therebetween a second parasitic capacitance through which the reset pulse signal is leaked to the CCD output signal of said image sensor means.

11. The device according to claim 10, wherein said picture element defect compensating means reduces the mixed reset pulse component contained in the CCD output signal from said defective picture element by temporarily decreasing the amplitude of the reset pulse signal at the time of reading out the image signal generated at said defective picture element.

12. The device according to claim 10, wherein, at the time of reading out the image signal produced from said defective picture element, said picture element compensating means generates, during an ON-period of the reset pulse signal supplied to said image sensor means, a pulse signal with its polarity opposite to that of said reset pulse signal, and reduces or decreases the mixed reset pulse component contained in the CCD output signal from said defective picture element in such a manner as to temporarily apply the pulse signal to said output gate electrode and, at the same time, apply the pulse signal to the CCD output signal produced from said image sensor means through said first parasitic capacitance.

* * * * *